United States Patent [19]

Morse

[11] 4,198,926

[45] Apr. 22, 1980

[54] METHOD TO INDUCE SPAWNING IN SHELLFISH

[75] Inventor: Daniel E. Morse, Santa Barbara, Calif.

[73] Assignee: The Regents of the University of California, Berkeley, Calif.

[21] Appl. No.: 893,881

[22] Filed: Apr. 6, 1978

[51] Int. Cl.² .............................................. A01K 61/00
[52] U.S. Cl. .......................................................... 119/4
[58] Field of Search ................................ 119/4, 3, 2, 1

[56] References Cited

U.S. PATENT DOCUMENTS 3,526,209  9/1970  Budge ........................................ 119/4

*Primary Examiner*—Hugh R. Chamblee
*Attorney, Agent, or Firm*—Herzig & Walsh, Incorporated

[57] ABSTRACT

Addition of an oxidizing agent which yields electronically activated oxygen, such as hydrogen peroxide, to seawater induces spawning and reproduction in shellfish, such as abalones, mussels, scallops and oysters. Such oxidizing agent, e.g. hydrogen peroxide, activates the enzymatic synthesis of prostaglandin-endoperoxide in reproductive tissues of shellfish, such as abalone.

19 Claims, No Drawings

METHOD TO INDUCE SPAWNING IN SHELLFISH

The Government has rights in this invention pursuant to Grant No. 04-6-158-44021 awarded by the U.S. Department of Commerce.

BACKGROUND OF THE INVENTION

This invention relates to inducing spawning and reproduction in shellfish such as abalone, and is particularly directed to a simple inexpensive readily controlled and safe chemical process for the above purpose.

The development of "mariculture" has thus far been unable to significantly increase the availability of affordable meat protein for most of the people of the world. This is largely because present shcemes for the necessary control of reproduction and morality of the animals under cultivation are often expensive. As a result, shellfish such as the crustacea and molluscs currently produced under cultivation are sold, for the most part, as luxury foods unavailable to the bulk of the population.

Although the marine invertebrate animals constitute a vast and protein-rich food resource, control of their reproduction remains one of the principal barriers to the economical cultivation of these animals for human consumption. Accordingly, scientists have begun to investigate chemical means for controlling the reproduction and early development of the abalone, a large herbivorous marine snail (molluscan gastropod) valued as a highly palatable source of meat-protein in parts of the United States, Mexico, Australia, Africa, China, and Japan.

Kikuchi and Uki, as reported in "Bull, Tokuku Fish, Res. Lab." 33, 69–78 (1974), demonstrated induction of spawning in abalones and other molluscs exposed to seawater which has been irradiated with ultraviolet (UV) light.

It is an object of the present invention to provide a novel and inexpensive, easily controlled and safe chemical method for inducing spawning and reproduction in shellfish such as abalones, and the like.

SUMMARY OF THE INVENTION

According to the invention, a procedure is provided to induce and control spawning and reproduction in shellfish in seawater, which comprises adding to the seawater an oxidizing agent which yields electronically activated oxygen, particularly hydrogen peroxide.

It has been found that the addition of low concentrations of such oxidizing agent, particularly hydrogen peroxide, to alkaline seawater will cause synchronous spawning of gravid male and female species of shellfish such as abalones, mussels, and scallops and oysters. It is believed that this effect results from a direct activation of the enzyme-catalyzed synthesis of a hormone-like molecule, prostaglandin-endoperoxide, implicated in the control of reproduction of many species of animals.

Thus there is provided an inexpensive and easily controlled chemical method for the control and synchronous induction of spawning in shellfish, particularly in many molluscan species important as food throughout the world.

DETAILED DESCRIPTION OF THE INVENTION AND PREFERRED EMBODIMENTS

In carrying out the invention process, shellfish to be treated, e.g. abalones, are placed in an aquarium or tank containing seawater. A small amount of hydrogen peroxide or other effective oxidizing agent, as defined below, is added directly to or generated within the seawater containing the gravid shellfish. The term "gravid" shellfish denotes that the shellfish are ready to spawn, that is are full of eggs or sperm. Such shellfish reproduce by broadcast spawning, with synchronous and copious liberation of gametes from animals of both sexes resulting in external fertilization. Male and female animals of responsive species will thus spawn synchronously within a matter of a few hours. Spawn liberated from abalones of either sex can trigger responsive spawning in animals of the opposite sex.

Induction of spawning by the oxidizing agent such as hydrogen peroxide is dependent both upon the concentration of the oxidizing agent added and upon the alkalinity of the seawater environment. The optimal concentration of oxidizing agent to be added is determined empirically for each species. Temperature of the seawater is also a factor.

After exposure of the shellfish in the seawater to the oxidant for a predetermined period of time. e.g. about 2½ hours in the case of abalone, the added chemicals can be removed by suitable means such as by decantation or neutralization, or the shellfish can be transferred to another container, prior to the actual release of eggs and sperm.

The oxidizing agent employed is one which yeilds an electronically activated or "free-radical" form of oxygen, such as the hydroperoxy free radical, HOO-, or the peroxy diradical, -OO-, which then functions as a stimulatory substrate for the enzymatic synthesis of prostaglandin-endoperoxide. The oxidizing agent can be added directly to or can be generated within the seawater, e.g. by decomposition.

Inorganic and organic peroxides having the above characteristics are suitable. Particularly preferred is hydrogen peroxide which can be added as an aqueous solution to the seawater. Other suitable oxidizing agents include sodium peroxide ($Na_2O_2$) or potassium superoxide ($KO_2$), both of which dissociate in water to yield electronically activated oxygen. Organic peroxides such as ethylene peroxide and prostaglandin peroxide, are also suitable according to the invention.

It has been found that a variety of common oxidizing agents which do not yield electronically activated oxygen, as noted above, do not induce spawning. Such ineffective oxidizing agents include sodium nitrite, thiosulfate, dichromate, perchlorate, periodate, hypochlorite and potassium permanganate.

Stimulation of the reaction catalyzed by the enzyme, noted above, to induce spawning, has been found to be proportional to the concentration of oxidizing agent such as $H_2O_2$. Thus a concentration of oxidizing agent, e.g. of hydrogen peroxide, ranging from about 0.1 to about 10 mM (milliMolar) can be used. Generally, concentrations ranging from about 1 to about 5 mM have been found most useful. Increasing concentrations of such oxidizing agent above the maximum in the above broad range, that is above 10 mM, become progressively inhibitory.

It has been found for best results, particularly with respect to use of hydrogen peroxide, that the alkalinity of the seawater should correspond to a pH range of about 7.8 to about 9.5, e.g. about 9. Such alkaline pH is achieved by adding any suitable base to the seawater in the container, such as NaOH, KOH, or an amine such as tris-hydroxymethyl aminomethane. Under such pH conditions, and at a concentration of suitable oxidizing agent, e.g. hydrogen peroxide, noted above, and under favorable temperature of the seawater, spawning is reproduceably caused in both male and female shellfish species, particularly abalones, within about 2½ to 3½ hours.

The temperature of the seawater during treatment with the oxidizing agent depends on the particular species of shellfish. Preferably the temperature is maintained close to the ambient temperature of the natural environment of such species. Thus, temperature of the seawater during treatment with the oxidizing agent can range from about 10° C. to about 25° C.

Following the required period of treatment of the seawater with the oxidizing agent, e.g. hydrogen peroxide, for about 2 to about 3 hours, such oxidizing agent is removed from the seawater in suitable manner, as by decantation of the hydrogen peroxide solution from the container, prior to the actual release of eggs and sperm of the particular shellfish species, and which is induced by the addition of the oxidizing agent. Thus, for example abalone can be exposed for about 2½ hours to hydrogen peroxide; the liquid hydrogen peroxide is removed, as noted above, and the container is filled with fresh seawater. In about ½ hour to about 1 hour later, spawning is induced. Once shed, the gametes (eggs and sperm) may be allowed to undergo fertilization directly, or they can be mixed in a precise ratio to insure the highest yield of fertilization and larval development.

Under optimal conditions, greater than 98% of abalone eggs and sperm shed in response to hydrogen peroxide induction, according to the invention, were fully competent for normal fertilization and embryonic development, yielding hatched, free swimming planktonic larvae 28 hours after fertilization. The hydrogen peroxide also induced synchronous spawning in male and female mussels, oysters and scallops.

Following is an example showing the effectiveness of the addition of hydrogen peroxide to seawater for inducing spawning in shellfish.

Induction of spawning in Haliotis rufescens (abalones). Comparably gravid, sexually mature animals (10–25 cm in length) which had been well-fed on the giant kelp Macrocystis pyrifera, were incubated individually in 12 liter tubs of well-aerated fresh running seawater, and thermostatically maintained at 13°–14° C. Groups of 6–12 animals, including those receiving "control" and oxidizing agent treatments, were tested in parallel for 5–24 hours after a one-hour pre-equilibration. Spawnings in response to treatment with oxidizing agent occurred within $3 \pm \frac{1}{2}$ hour after commencement of such treatment.

In the table below the control treatment included hourly additions (50 ml) of either fresh water, seawater, or seawater from tubs containing unspawned gravid abalones. For those abalones subjected to treatment with hydrogen peroxide, tris-hydroxymethyl aminomethane was used to maintain pH of the seawater at about 9.1 $H_2O_2$ (prepared by fresh dilution from 30% solution) was added to the alkaline seawater to maintain the concentration of $H_2O_2$ at 5 mM. After about 2½ hours, the seawater containing the $H_2O_2$ solution was removed by decantation and fresh seawater was added to the container. About one hour later spawning commenced.

The data and results are shown in the table below:

TABLE

| Treatment | Total Number of Animals | |
|---|---|---|
| | Tested | Spawned |
| Controls | 77 (47 F, 30 M) | 3 (2 F, 1 M) |
| $H_2O_2$ | 31 (17 F, 14 M) | 30 (16 F, 14 M) |
| F = female | | |
| M = male | | |

The above table shows the effectiveness of $H_2O_2$ treatment in inducing spawning in abalones.

From the foregoing, it is seen that the present invention for inducing spawning in shellfish by the addition to seawater of certain oxidizing agents, particularly hydrogen peroxide, provides an inexpensive readily controlled chemical method for this purpose. The chemicals employed and in the low concentrations thereof used in the invention procedure are non-persistant, and pose no hazard to food or water supplies. According to the invention procedure, eggs and sperm of shellfish shed in response to the oxidant, particularly hydrogen peroxide, treatment can be obtained in high yield of fertilization, hatching and normal embryonic and larval development. The present method is thus particularly applicable to production of the protein-rich and highly palatable shellfish food resources.

It has been found particularly that the method of the present invention is more inexpensive, more readily controlled and much more reproduceable than the above-noted prior art method of inducing spawning of shellfish by irradiation of water with ultra-violet light. The invention method also readily lends itself to large-scale cultivation and simultaneous treatment of large numbers of shellfish in large volumes of water.

It will be understood that various changes and modifications in the invention will occur to those skilled in the art, and the invention accordingly is not to be taken as limited except by the scope of the appended claims.

What is claimed is:

1. A method to induce and control spawning and reproduction in shellfish in seawater, which comprises adding to the seawater a sufficient concentration of an oxidizing agent which yields electronically activated oxygen, under conditions of alkalinity of the seawater and temperature thereof to induce said spawning and reproduction.

2. The method as defined in claim 1, wherein said oxidizing agent is a peroxide.

3. The method as defined in claim 1, wherein said oxidizing agent is an inorganic or an organic peroxide.

4. The method as defined in claim 1, wherein said peroxide is selected from the group consisting of hydrogen peroxide, sodium peroxide and potassium superoxide.

5. The method as defined in claim 1, wherein the concentration of said oxidizing agent can range from about 0.1 to about 10 mM.

6. The method as defined in claim 1, said shellfish selected from the group consisting of abalone, mussels, oysters and scallops.

7. The method as defined in claim 1, wherein said oxidizing agent is hydrogen peroxide.

8. The method as defined in claim 7, said halogen peroxide being added in low concentration to alkaline seawater.

9. The method as defined in claim 7, the addition of said hydrogen peroxide to said shellfish causing synchronous spawning of male and female shellfish species.

10. The method as defined in claim 7, wherein the concentration of said hydrogen peroxide can range from about 1.0 to about 5 mM.

11. The method as defined in claim 10, wherein the seawater is subjected to the action of said hydrogen peroxide for a period of about 2 to about 3 hours.

12. The method for controlling and inducing synchronous spawning of gravid male and female shellfish species including abalones, mussels, oysters and scallops, which comprises introducing said shellfish into a container containing seawater, and adding aqueous hydrogen peroxide solution to said seawater at low concentrations of said hydrogen peroxide.

13. The method as defined in claim 12, said seawater being adjusted to an alkaline pH of about 7.8 to about 9.5, prior to addition of said hydrogen peroxide solution.

14. The method as defined in claim 13, the concentration of hydrogen peroxide in said seawater ranging from about 0.1 to about 10 mM.

15. The method as defined in claim 12, the concentration of hydrogen peroxide in said seawater ranging from about 0.1 to about 10 mM, said seawater being adjusted to an alkaline pH of about 7.8 to about 9.5, prior to addition of said hydrogen peroxide solution, the temperature of said seawater ranging from about 10° C. to about 25° C.

16. The method as defined in claim 15, said treatment of said seawater with said hydrogen peroxide solution being carried out for a period sufficient to induce said spawning, of about 2 to about 3 hours, and including removing said hydrogen peroxide from said container following said period of treatment, and adding fresh seawater to said container prior to the commencement of said spawning.

17. A method to induce and control spawning and reproduction in shellfish in seawater, which comprises adding to the seawater a peroxide which yields electronically activated oxygen, the concentration of said oxidizing agent ranging from about 0.1 to about 10 mM, said seawater being adjusted to an alkaline pH of about 7.8 to about 9.5, the temperature of said seawater ranging from about 10° C. to about 25° C.

18. The method as defined in claim 17, wherein said peroxide is selected from the group consisting of hydrogen peroxide, sodium peroxide and potassium superoxide.

19. The method as defined in claim 17, wherein said oxidizing agent is hydrogen peroxide.

* * * * *